Patented Aug. 6, 1935

2,010,560

UNITED STATES PATENT OFFICE 2,010,560

ESTERS OF ETHYLENE GLYCOL ETHERS

Clayton Olin North, Nitro, W. Va., assignor, by mesne assignments, to Herbert S. Kreighbaum, Akron, Ohio No Drawing. Application October 22, 1932, Serial No. 639,043

2 Claims. (Cl. 260—106)

This invention relates to new compositions containing oleates or other unsaturated fatty acid esters of ethylene glycol monomethyl ether.

One object of this invention is the provision of new plasticizers for nitrocellulose and resins, such as phenol-formaldehyde resins.

Another object of this invention is the provision of new plasticizers having high boiling points.

A further object of this invention is the provision of a plasticizer having a high resistance to ultra violet light.

Other objects of this invention will be in part obvious and in part pointed out hereinafter.

One example of my invention is the oleic acid ester of beta methoxy ethanol, which may be called methoxyethyl oleate, whose structural formula may be represented:

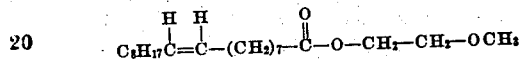

This ester may be prepared as follows:

| | Parts by weight |
|---|---|
| Oleic acid | 2256 |
| Ethylene glycol monomethyl ether, and | 1216 |
| Toluene | 697 | are charged into a suitable reaction vessel. A mixture of about 29 parts by weight of 66° Bé. sulfuric acid and about 16 parts of water by weight are stirred into the mixture, which is then heated so that slow distillation results. The reaction vessel is equipped with a column and condenser. Heating is carried on in such a way that beta methoxy ethanol (ethylene glycol monomethyl ether) is largely returned by the reflux from the column but the toluene, water and some methoxy ethanol go over into the condenser. By means of a separator, the toluene distilled out is continuously removed from the water layer and returned to the esterification vessel. The heat necessary for promoting the reaction and removing water may be supplied in any convenient manner, for example, by circulating oil or steam. Stirring during esterification is desirable but not necessary. The esterification, which is quite rapid, requires from about 4 to 5 hours for completion.

When water ceases to come off, the distillation is continued and most of the toluene and methoxy ethanol are removed at atmospheric pressure, to a vapor temperature of about 104 to 105° C. The crude reaction product is then washed with about an equal volume of water. The wash mixture is allowed to settle and the aqueous layer is drawn off.

The washed ester is now run to a still designed for vacuum distillation and distilled at a pressure less than 20 mm. of mercury. At the beginning of the distillation, heads consisting of toluene, ethylene glycol monomethyl ether and some oleic acid, are removed up to a temperature of approximately 220° C. at a pressure of about 9 mm. The distillate is then run into a receiver for the ester. The oleic acid ester of beta methoxy ethanol distills at about 220° C.–240° C. at 9 mm. pressure. This product is sufficiently pure for use as a plasticizer for nitro-cellulose. However, if a purer material is desired, the product can be mixed with about five times its volume of hot water and a base added until the water shows an alkaline reaction. The ester is then separated from the aqueous portion and dried, preferably in vacuo, and vacuum distilled. The pure ester boils at about 222–225° C. at 6 mm. pressure.

While I have given a specific example of my invention, it is to be expressly understood that variations in the process may be employed. For example, gaseous hydrochloric acid may be employed as the condensing agent instead of sulfuric acid, in which case a water wash is not usually found to be necessary before distillation.

The heads of first fraction obtained in the vacuum distillation may be used in subsequent esterifications after making allowances for the toluene, beta methoxy ethanol and oleic acid present.

The oleate of butoxy ethanol may be prepared as follows:

| | Parts by weight |
|---|---|
| Beta butoxy ethanol | 177 |
| Oleic acid | 288 |
| Toluene | 86 |
| Sulfuric acid (66° Bé.) dissolved in equal weight of water | 3.6 | are reacted in apparatus and by the method described above under the preparation of methoxyethyl oleate. This product butoxy ethyl oleate, distills between 250 and 260° C. at about 12 mm. pressure. The material is a pale yellow and slightly viscous liquid.

The oleates of diethylene glycol ethers may also be employed. For example, the oleate of diethylene glycol mono butyl ether may be prepared as follows:

| | Parts by weight |
|---|---|
| Diethylene glycol mono butyl ether | 243 |
| Oleic acid | 282 |
| Toluene | 86 |
| 66° Sulfuric acid (dissolved in an equal weight of water) | 3.6 | are reacted by the same method and in similar apparatus as described under the preparation of methoxy ethyl oleate. In this case the esterification takes somewhat longer. Usually in six hours all the water to be liberated has been collected. In all these esterifications the reaction is carried on until the theoretical amount of water is collected. The product distills between 255 and 270° C. at 10 mm. The oleate of diethylene glycol mono butyl ether has a density of about 0.905 at 25° C.

The methoxyethyl oleate prepared according to the method given above has a high resistance to ultra violet rays and is also a good plasticizer for nitrocellulose. When the methoxyethyl oleate is used as a plasticizer in a nitrocellulose lacquer, especially in white lacquers used for coating refrigerators and the like, a lacquer is produced which does not darken when heated or does not become more than faintly yellow when subjected to ultra violet light or diffused daylight. Because of the high boiling point of the plasticizer, it is practically non-volatile at ordinary temperatures and, therefore, stays in the film to maintain the plasticity thereof. Retentivity is good.

The methods herein described for the preparation of the ether alcohol oleates are to be considered as illustrative only of how these products may be prepared. I do not limit myself to these methods but any other methods may be employed which produce my new compounds.

My products may be described as follows:

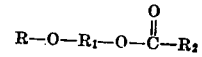

R may be any alkyl or aryl group. $R_1$ may be any alkyl or aryl group and may be an ether-alcohol radical as the radical from diethylene glycol or the like. $R_2COO$ may be any unsaturated fatty acid radical, e. g., oleic, elaidic, or the like. $R_2COO$ also covers the fatty acids of resin and other resins such as ponti resin and those of various oils, provided such oils are not glycerides or other esters of saturated or unsaturated acids containing hydroxy groups. By ponti resin I mean the resin obtained from pontianak rubber which is commonly known among rubber men as ponti resin.

The term "radical" as used above includes the meaning of the word "rest" as understood in German technology.

What I claim is:

1. As a new compound, the oleic acid ester of beta methoxy ethanol.

2. A composition adapted for use as a plasticizer and a solvent for nitrocellulose and resins, which consists of an oleic acid ester of a methoxy ethanol.

CLAYTON OLIN NORTH.